E. A. CHASE.
CHUCK.
APPLICATION FILED MAY 26, 1920.
1,375,777. Patented Apr. 26, 1921.
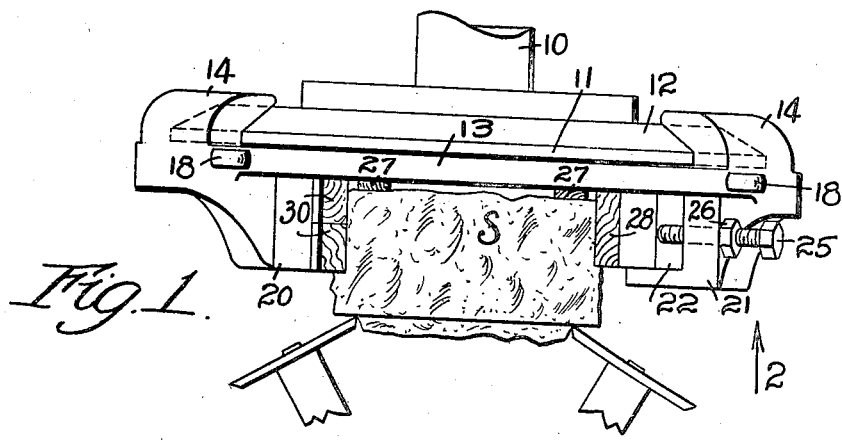
Fig. 1.
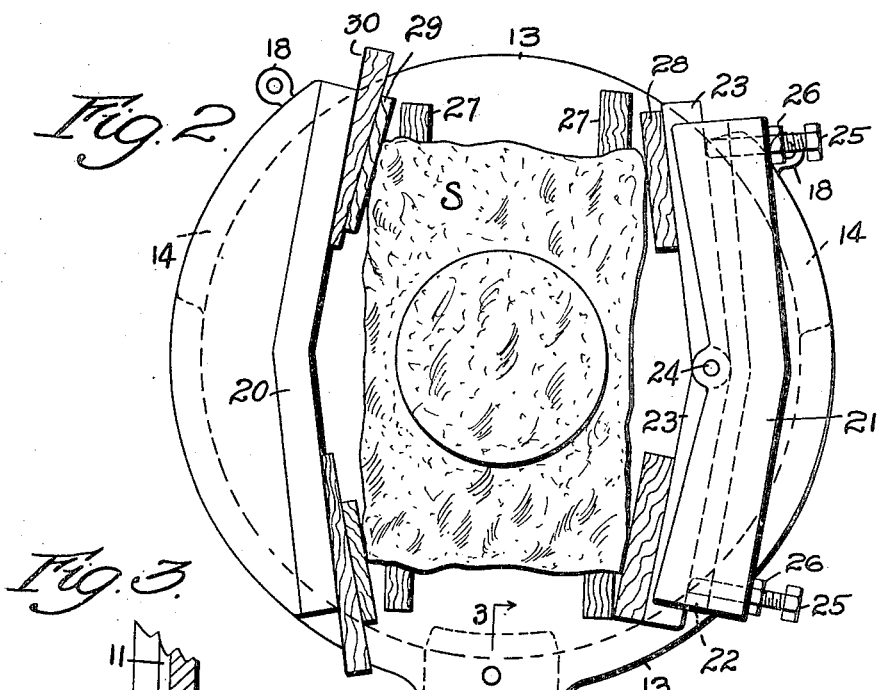
Fig. 2.
Fig. 3.
Inventor
Elroy A. Chase.
by attorneys
Southgate & Southgate
Witness
C. F. Wesson

UNITED STATES PATENT OFFICE.

ELROY A. CHASE, OF NORTHFIELD, VERMONT.

CHUCK.

1,375,777. Specification of Letters Patent. Patented Apr. 26, 1921.

Application filed May 26, 1920. Serial No. 384,248.

*To all whom it may concern:*

Be it known that I, ELROY A. CHASE, a citizen of the United States, residing at Northfield, in the county of Washington and State of Vermont, have invented a new and useful Chuck, of which the following is a specification.

This invention relates to a chuck, particularly designed for use on a stone-finishing machine.

It is desirable to secure the stone in the chuck while the latter is removed from the machine and placed with its supporting face in horizontal position. Accordingly, one object of my invention is to provide a chuck so constructed that it may be easily placed in operative position in the machine or may be as easily removed therefrom even when holding a heavy block of stone therein.

Another object of my invention is to provide a chuck having holding jaws particularly adapted to holding blocks of rough stone. With this object in view I provide a rigid jaw, preferably having portions inclined toward each other to a limited extent, in combination with movable jaws whose inclination may be adjusted.

Further features of my invention relate to arrangements and combinations of parts hereinafter described and more particularly pointed out in the appended claims.

A preferred form of my invention is shown in the drawings in which—

Figure 1 is a side elevation of my improved chuck;

Fig. 2 is a plan view thereof, taken in the direction of the arrow 2 in Fig. 1; and Fig. 3 is a detail sectional view taken along the line 3—3 in Fig. 2.

Referring to the drawings, I have shown my improved chuck as mounted on a shaft 10 having a face plate 11 provided with a rearwardly beveled edge portion 12. The chuck comprises a body 13 having a pair of lugs 14 projecting rearwardly and undercut on their inner faces to fit the beveled edge of the face plate 11.

At the opposite edge of the body 13, the body is extended to form a projection 15 to which a clamping plate 16 (Fig. 3) is secured by a binding screw 17. The plate 16 is beveled to fit the edge of the face plate, as clearly shown in Fig. 3.

Ring bolts 18 are fixed in the edge of the body 13 adjacent the lugs 14 and constitute means by which the chuck may be easily attached to a crane or other hoisting apparatus after a block of stone has been adjusted and secured therein. The chuck is then moved to the finishing machine and is gradually lowered until the lugs 14 engage the face plate 11 and the chuck is supported thereby. The clamp 16 is then adjusted, firmly securing the chuck in place. This method of securing and holding the chuck to the face plate is found particularly adapted to the heavy work for which this chuck is designed.

The means for holding the stone to the face of the chuck comprises a rigid jaw 20, preferably formed with two holding faces disposed at an angle to each other as shown in Fig. 2. Upon the opposite side of the chuck, a projecting member 21 is rigidly secured to the body 13, or is made integral therewith and is provided with an undercut recess 22 to receive movable jaws 23. The jaws 23 are pivoted at 24 to the member 21 and are engaged at their free ends by adjusting screws 25 extending through the member 21. Lock nuts 26 are provided to hold the adjusting screws in fixed position.

A block of stone "S," being placed on the chuck when the latter is in horizontal position, it is first leveled up by means of wedges 27 and is then centered between the jaws of the chuck. Blocks 28 and 29 are preferably interposed between the jaws and the stone, and the final clamping pressure on the stone is commonly applied by driving wedges 30 between the rigid jaw 20 and the blocks 28 and 29.

The wedges 27 and 30 and the blocks 28 and 29 are all preferably of wood, as it is found that the rough stone beds itself in the wood and is thus held more securely than it can be by direct engagement with the metal jaws. When the stone is to be removed, the screws 25 may be loosened to release the stone.

Having thus described my invention, it will be evident that changes and modifications can be made therein by those skilled in the art within the spirit and scope thereof as set forth in the claims, and I do not wish to be otherwise limited to the details herein disclosed, but what I claim is:—

1. A chuck for a machine having a face plate, comprising a body, means to secure the work thereto, a pair of rigid lugs thereon fitting the edge of said face plate, and a clamping device oppositely disposed relatively to said lugs and effective to engage the edge of said face plate to hold said chuck in position.

2. A chuck for a machine having a rearwardly beveled face plate, comprising a body, means to secure the work thereto, a pair of inwardly beveled lugs positioned at separated points on the periphery of said chuck and fitting the edge of the face plate, and means to clamp said chuck to said plate at a third point thereof, oppositely disposed relatively to said lugs.

3. A chuck for holding stone comprising a body, a rigid jaw on said body having its holding face formed in two portions inclined to each other, a pair of jaws pivoted on said body, and means to swing either jaw toward said rigid jaw.

4. A chuck for holding stone comprising a body, a rigid jaw on said body, jaws pivoted to said body, means to move said latter jaws toward the rigid jaw, and wedges effective to bind the work between said jaws.

5. A chuck comprising a body, holding portions fixed thereto and inwardly inclined toward each other, additional holding portions adjustably secured to said body, and means to adjust said latter portions at different inclination to each other.

6. A chuck comprising a body, a rigid jaw on said body, a projecting member fixed to said body and having a recessed inner face, movable jaws positioned in said recess and pivoted to said member, and adjusting screws threaded in said member and engaging said jaws to determine the angular position thereof.

In testimony whereof I have hereunto affixed my signature.

ELROY A. CHASE.